United States Patent [19]

Inoue

[11] Patent Number: 4,543,460
[45] Date of Patent: Sep. 24, 1985

[54] GENERIC ELECTRODE EDM METHOD AND APPARATUS, AND ASSEMBLY FOR MAINTAINING CHIP CONCENTRATION IN THE GAP AT AN ENHANCED LEVEL

[75] Inventor: Kiyoshi Inoue, Tokyo, Japan

[73] Assignee: Inoue-Japax Research Incorporated, Yokohama, Japan

[21] Appl. No.: 469,138

[22] Filed: Feb. 23, 1983

[30] Foreign Application Priority Data

Feb. 25, 1983 [JP] Japan .................. 57-29720

[51] Int. Cl.⁴ ................................. B23P 1/12
[52] U.S. Cl. ..................... 219/69 M; 204/129.5; 204/280; 204/288; 219/69 D; 219/69 E; 219/69 G
[58] Field of Search ................ 219/69 R, 69 E, 69 D, 219/69 M, 69 G; 204/129.5, 129.6, 129.65, 280, 288

[56] References Cited

U.S. PATENT DOCUMENTS

| 2,457,234 | 12/1948 | Herbert et al. | 204/129.2 |
|---|---|---|---|
| 2,512,706 | 6/1950 | Anderson | 219/69 E |
| 2,848,410 | 8/1958 | Knuth-Winterfeldt et al. | 204/129.6 |
| 2,909,641 | 10/1959 | Kucyn | 219/69 E |
| 3,125,665 | 3/1964 | Snider | 219/69 E |
| 3,306,838 | 2/1967 | Johnson | 219/69 E |
| 3,719,569 | 3/1973 | Gosger | 204/129.6 |
| 3,860,779 | 1/1975 | Marendaz | 219/69 G |
| 3,919,515 | 11/1975 | Bangs | 219/69 E |
| 3,975,607 | 8/1976 | Ullmann et al. | 219/69 G |
| 4,049,942 | 9/1977 | Balleys et al. | 219/69 G |
| 4,110,190 | 8/1978 | Visser | 204/129.65 |
| 4,185,184 | 1/1980 | Pfau | 219/69 G |
| 4,251,706 | 2/1981 | Frei et al. | 219/69 D |
| 4,318,786 | 3/1982 | Lahoda et al. | 204/129.5 |
| 4,319,115 | 3/1982 | Bonga | 219/69 E |
| 4,367,391 | 1/1983 | Furukawa | 219/69 M |
| 4,375,588 | 3/1983 | Frei | 219/69 G |

FOREIGN PATENT DOCUMENTS

| 789293 | 1/1958 | United Kingdom . | |
|---|---|---|---|
| 1177822 | 1/1970 | United Kingdom . | |
| 1231526 | 5/1971 | United Kingdom . | |
| 1525712 | 9/1978 | United Kingdom . | |
| 1556441 | 11/1979 | United Kingdom . | |
| 2061793 | 5/1981 | United Kingdom . | |
| 2074074A | 10/1981 | United Kingdom | 219/69 V |

Primary Examiner—Roy N. Envall, Jr.
Assistant Examiner—Geoffrey S. Evans
Attorney, Agent, or Firm—Karl F. Ross; Herbert Dubno

[57] ABSTRACT

An EDM method and apparatus, utilizing a generic electrode, i.e. a tool electrode independent in shape of a desired cavity or contour to be machined in a workpiece, and utilizing a three-dimensional machining feed displacement, makes use of an assembly for maintaining the contamination of the machining liquid with machining products, e.g. chips and gases, at a certain enhanced level. The assembly includes a pad or block member disposed in the proximity of the workpiece with a small spacing therewith while surrounding the generic electrode to mechanically control or limit discharging of the machining products out of the EDM gap, thereby enabling a stabilized production of machining electrical discharges across the EDM gap maintained substantially constant.

12 Claims, 5 Drawing Figures

GENERIC ELECTRODE EDM METHOD AND APPARATUS, AND ASSEMBLY FOR MAINTAINING CHIP CONCENTRATION IN THE GAP AT AN ENHANCED LEVEL

FIELD OF THE INVENTION

The present invention relates to generic electrode EDM (electrical discharge machining) and, more particularly, to an improved EDM method of and apparatus for three-dimensionally machining a desired pattern, e.g. a cavity, in an electrically conductive workpiece with at least one generic electrode, as well as to an assembly for use in such three-dimensional EDM processes, for maintaining the concentration of machining products in the machining liquid at the EDM gap at or in excess of a predetermined enhanced level.

The term "generic electrode" is used herein, as accepted in the art, to refer to an axial non-formed tool electrode of a simple machining surface contour which may be cylindrical, triangular or square in cross section and which is generally dissimilar or independent of the three-dimensional shape of a final cavity or contour to be machined in a workpiece. Such a "generic electrode" is distinguished from a formed tool electrode with a mirror image or a scaled-down or scaled-up image of the three-dimensional cavity or contour desired in the workpiece.

BACKGROUND OF THE INVENTION

In the three-dimensional EDM process with at least one generic tool electrode having a machining surface contour at an end portion thereof, the tool electrode is axially juxtaposed with a workpiece to position the machining surface contour in spaced juxtaposition therewith across an EDM gap supplied with a machining liquid. A succession of electrical discharges are produced across the EDM gap to electroerosively remove stock from a localized portion of the workpiece juxtaposed with the machining surface contour. To advance the process, the workpiece is displaced relative to the tool electrode along a three-dimensional path, typically under numerical control, while the width of the EDM gap is held substantially constant whereby the desired cavity or contour dissimilar to the generic electrode and basically determined by the path of the three-dimensional feed displacement effected between the tool electrode and the workpiece is carved out in the workpiece.

The advantages of the generic electrode EDM process over the conventional "sinking" EDM process which makes it essential to use several similar formed electrodes of mirror images of a desired cavity or contour are being increasingly recognized in the art. In the sinking EDM process, it has been found to be very difficult to prepare a formed tool electrode of a precise mirror image of a desired cavity or contour. In addition, several such electrodes of slightly varying sizes are required to allow repetition of the process in different modes ranging from roughing to finishing. Because of these electrode factors the sinking EDM process for machining a three-dimensional cavity or contour has been very costly and laborious. There is also the problem of electrode positioning at successive stages of electrode exchange. It has also be recognized that as the machining depth increases the rate of stock removal decreases and this necessitates a sophisticated power supply, and complex controls of machining feed, dielectric circulation and electrode reciprocation.

By contrast, in the generic EDM process a simple tool electrode in the form of a cylinder of small cross section or the like, or more than one such simple electrode varying in size can simply be employed to machine a large and/or intricate cavity or contour. The cavity or contour is easily machined in the workpiece by displacing the generic electrode and the workpiece relative to each other, under numerical or sequence-copying control, along a prescribed three-dimensional path which determines the final cavity or contour desired in the workpiece. Since the generic electrode is allowed to move generally in an open space to advance machining, the process does not present a problem as is encountered by sinking EDM as the depth increases.

While the generic EDM process offers these particular advantages, it has now been found that its "open space" feature presents a particular problem. Thus, due to the fact that the active machining surface of the electrode is much smaller than the area of the workpiece traversed thereby, chips and gases produced by the electrical discharges are removed rather quickly from the EDM gap. As a result, the concentration of these machining products in the machining liquid at the EDM gap remains at an undesirably low level. The inventor's experimentation shows that for stock removal electrical discharges to be produced consecutively or with stability, the machining liquid must be contaminated with the machining products to a certain degree. Thus, in the process, while abnormal electrical discharges due to an excessive accumulation of the machining products in the gap seldom occur, it has been found that the machining electrical discharges tend to be destabilized or fail to occur consecutively. This may result in an unstable machining feed displacement and unsatisfactory machining performance.

For example, utilizing a kerosene machining liquid, under a no-load pulse voltage of 100 volts, an electrical discharge is not created until the machining gap between the generic electrode and the workpiece is narrowed to as small as 3 $\mu$m. By comparison, in the sinking EDM process a gap spacing of as wide as 39 $\mu$m is satisfactory to allow successive, time-spaced electrical discharges to be created consecutively or with a rate of occurrence of electrical discharges per applied voltage pulses ranging from 40 90%. This evidently is due to the fact that machining products produced by previous discharges are contained at a significant proportion in the machining liquid and facilitate the production of subsequent electrical discharges.

Assume that by means of a servo feed, the machining gap is narrowed to a spacing of 3 $\mu$m to allow an electrical discharge to occur followed by several electrical discharges due to the consecutive application of voltage pulses. The servo system will then find the gap spacing of 3 $\mu$m too small and act to widen the machining gap. Due to inertia inherent in the servo system, the gap is then widened to an excessive extent (e.g. 50 to 60 $\mu$m) such that an electrical discharge may no longer occur. The servo system will then act on the generic electrode to narrow the gap. At this stage the machining products will have been substantially completely carried out to clear the machining gap because of the open-space arrangement of the generic electrode. Thus, the machining gap will have to be reduced to as narrow a spacing as the previous spacing of 3 $\mu$m. The result of repetitions of such a cycle is so-called "hunting" which allows no substantial or only an extremely limited stock removal from the workpiece.

OBJECTS OF THE INVENTION

It is accordingly an important object of the present invention to provide a new and improved generic electrode EDM method which can overcome the problems which have been encountered heretofore.

Another important object is to provide a new and improved EDM apparatus utilizing one or more generic electrodes which apparatus allows machining electrical discharges to take place with increased stability.

A further important object of the present invention is to provide an assembly for use with the generic electrode EDM system whereby the concentration of the machining products in the machining liquid at the EDM gap is maintained at or in excess of a predetermined enhanced level so as to allow the stabilized production of consecutive electrical discharges.

SUMMARY OF THE INVENTION

In accordance with the present invention there is provided, in a first aspect thereof, an EDM method of machining a desired pattern in an electrically conductive workpiece with at least one tool electrode having a machining surface contour which is of a configuration generally independent of the shape of the desired pattern, which method comprises: (a) axially juxtaposing the tool electrode with the workpiece to position the machining surface contour in a spaced juxtaposition therewith across an EDM gap supplied with a machining liquid; (b) disposing a pad or block member having a central bore therein in the proximity of the workpiece so as to have at least a portion of the tool electrode proximate to the machining surface contour situated in the central bore; (c) electrically insulating the block member both from the tool electrode and the workpiece; (d) producing a succession of electrical discharges across the EDM gap to electroerosively remove stock from a localized portion of the workpiece juxtaposed with the machining surface contour while permitting machining products produced by the electrical discharges to be accumulated in the EDM gap for discharge therefrom; and (e) controlling, with the disposed block member, the discharge of the machining products out of the EDM gap so that the concentration of the machining products in the machining liquid in the EDM gap with the machining products is maintained in excess of a predetermined level to stabilize the electrical discharges while effecting a multi-axial machining feed displacement between the tool electrode and the workpiece along a predetermined three-dimensional path defined by three coordinate axes including a pair of coordinate axes defining a plane substantially orthogonal to the longitudinal axis of the tool electrode and a coordinate axis substantially orthogonal to the plane and simultaneously maintaining the width of the EDM gap substantially constant, thereby three-dimensionally machining the workpiece at least in part by the stabilized electrical discharges to form the desired pattern in the workpiece.

The invention also provides, in a second aspect thereof, an EDM apparatus for machining a desired three-dimensional pattern in a workpiece, which apparatus comprises: at least one tool electrode having a machining surface contour which has a configuration generally independent of the shape of the desired pattern and adapted to be axially juxtaposed with the workpiece to position the machining surface contour in a spaced juxtaposition therewith across an EDM gap supplied with a machining liquid; a pad or block member having a central bore therein and adapted to be disposed in the proximity of the workpiece so as to locate at least a portion of the tool electrode proximate to the machining surface contour in the bore, the member being so constructed as to establish an electrical insulation both from the electrode and the workpiece; power supply means for producing a succession of electrical discharges across the EDM gap to electroerosively remove stock from a localized portion of the workpiece when juxtaposed with the machining surface contour while permitting machining products produced by the electrical discharges to be accumulated in the EDM gap for discharge therefrom; means for holding the block member and thereby controlling the discharge of the machining products out of the EDM gap so that the concentration of the machining products in the machining liquid in the EDM gap is maintained in excess of a predetermined level to stabilize the electrical discharges; and feed means for effecting a multi-axial machining feed displacement between the tool electrode and the workpiece along a predetermined three-dimensional path defined by three coordinate axes including a pair of coordinate axes defining a plane substantially orthogonal to the longitudinal axis of the tool electrode and a coordinate axis substantially orthogonal to the plane while maintaining the width of the EDM gap substantially constant, thereby three-dimensionally machining the workpiece at least in part by the stabilized electrical discharges to form the desired pattern in the workpiece.

The invention provides, in a third aspect thereof, an assembly for use with the generic electrode EDM apparatus and for maintaining the concentration of the machining products in the machining liquid at the EDM gap in excess of a predetermined level, which apparatus is especially for machining a three-dimensional pattern in an electrically conductive workpiece and has at least one tool electrode which has a machining surface contour having a configuration generally independent of the shape of the desired pattern and adapted to be axially juxtaposed with the workpiece to position the machining surface contour in a spaced juxtaposition therewith across an EDM gap supplied with a machining liquid, power supply means for producing a succession of electrical discharges across the EDM gap to electroerosively remove stock from a localized portion of the workpiece when juxtaposed with the machining surface contour while permitting machining products produced by the electrical discharges to be accumulated in the EDM gap for discharge therefrom, and feed means for effecting a multi-axial feed displacement between the tool electrode and the workpiece along a predetermined three-dimensional path defined by three coordinate axes including a pair of coordinate axes defining a plane substantially orthogonal to the longitudinal axis of the tool electrode and a coordinate axis substantially orthogonal to the plane while maintaining the width of the EDM gap substantially constant, thereby three-dimensionally machining the workpiece at least in part by the electrical discharges to form the desired pattern in the workpiece, the said assembly comprising: a pad or block member having a central bore formed therein and adapted to be disposed in the proximity of the workpiece so as to locate at least a portion of the tool electrode proximate to the machining surface contour in the bore, the member being so constructed as to establish an electrical insulation at least from the workpiece; and means for holding the block member and thereby controlling the discharge of the machining products from the EDM gap to stabilize the electrical discharges in the three-dimensional machining of the desired pattern in the workpiece.

BRIEF DESCRIPTION OF THE DRAWING

These and other features of the present invention as well as advantages thereof will become more readily apparent from the following description of certain preferred embodiments thereof when taken with reference to the accompanying drawing in which.

SPECIFIC DESCRIPTION

Figure 1:
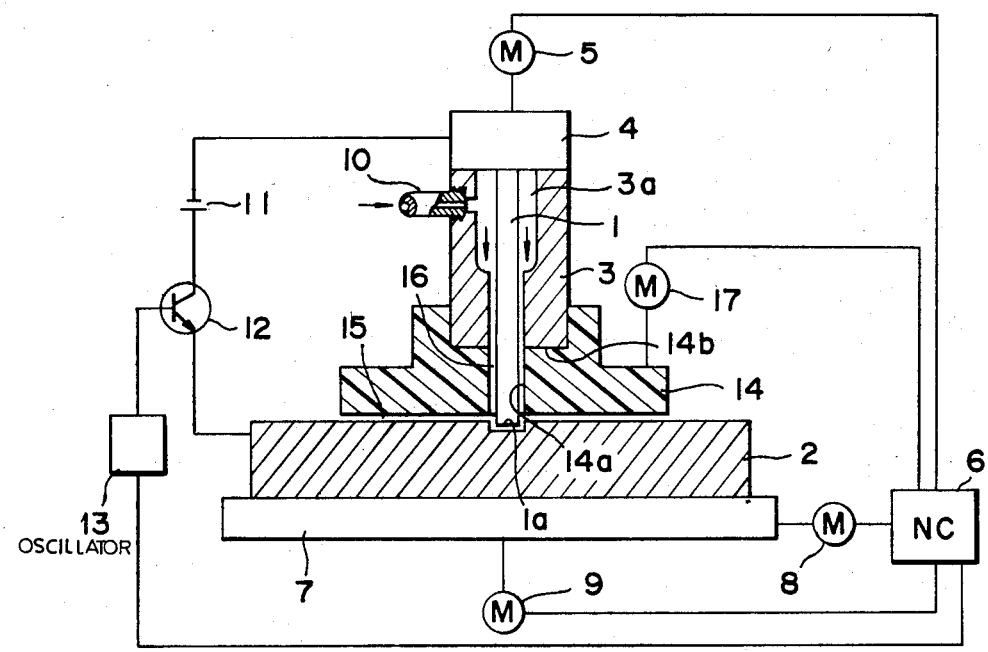
FIG. 1 is a front elevational view in section diagrammatically illustrating an EDM arrangement incorporating an assembly according to the invention for maintaining the contamination of the machining liquid in the EDM gap at or in excess of a certain enhanced level.

Referring now to FIG. 1 there is shown an EDM apparatus which makes use of a generic electrode 1, i.e. a tool electrode having a machining surface contour 1a which is of a configuration generally independent of the shape of a desired pattern, i.e. a cavity or contour, to be carved out by electroerosion in a workpiece 2. The area of the active machining surface contour 1a of the electrode 1 is much smaller than the total contour of the pattern to be machined. The active machining area 1a is served by an end portion of the electrode 1 lying in the direction of its longitudinal axis, i.e. as shown, in the vertical direction as well as in a plane orthogonal to the longitudinal axis, i.e., as shown, in a horizontal plane.

The tool electrode 1 is shown to be axially juxtaposed with the workpiece 2 to position the active machining contour 1a in spaced juxtaposition therewith across an EDM gap. The electrode 1 extends through an internal bore of a cylindrical guide member 3 and is axially displaceable in the vertical direction or the direction of a Z-axis by a drive assembly 4. The drive assembly 4 is controlled by a motor 5 which is supplied from a numerical control unit 6 with command drive signals (pulses) to control the vertical position of the active machining contour 1a and the feed displacement thereof in the direction of depth in the workpiece 2. In addition, the drive assembly 4 is designed to respond to a gap signal and act to maintain the gap spacing between the active machining contour 1a and the workpiece 2 substantially constant. The gap spacing is maintained substantially constant also in compensation for the electroerosive wear of the tool electrode 1. The drive assembly 4 may have a further additional function or functions to rotate the tool electrode 1 about its longitudinal axis, and/or to intermittently retract the tool electrode away from the workpiece.

The workpiece 2 is securely mounted on a worktable 7 in a cross-feed configuration which is driven by a pair of motors 8 and 9 supplied with command drive signals (pulses) from the NC unit 6. The motor 8 is driven to displace the workpiece 2 in the direction of an X-axis and the motor 9 to displace the workpiece 2 in the direction of a Y-axis in an X-Y or horizontal plane. The NC unit 6 has a set of programmed data stored therein which defines a path of relative three-dimensional feed displacement between the active machining contour 1a and the workpiece 2 that is prescribed to determine the shape of a cavity to be carved out by electroerosion in the workpiece 2. An electroerosion medium or machining liquid is supplied under pressure, e.g. at a pressure of 1 kg/cm$^2$, into the EDM gap from a source (not shown) by an inlet pipe 10 and the internal bore 3a of the guide member 3. Typically, the workpiece 2 is received in a worktank (not shown), and the latter is securely mounted on the worktable 7 and filled with the machining liquid so as to completely immerse the workpiece 2 deep therein, although the workpiece 2 may be only partially immersed or free from immersion especially where the machining liquid used is an inflammable fluid such as water (distilled). The machining liquid in the worktank is drained and, upon purification, recycled into the inlet 10.

The electroerosion is performed by an EDM power supply which is here shown as comprising a DC source 11 and a power switch 12 which are connected in series with the tool electrode 1 and the workpiece 2. The power switch 12 is energized with a succession of signal pulses furnished from an oscillator 13 which is controlledly operated in response to command signals from the NC unit 6. Thus, under the commands of the NC unit 6, a succession of voltage pulses with time parameters set in the oscillator 13 are applied between the tool electrode 1 and the workpiece 2 and may cause discrete, time-spaced or intermittent electrical discharges across the EDM gap formed between the active electrode contour 1a and the workpiece 2 to electroerosively remove stock from the workpiece 2. The stock removal action is accompanied by the formation of machining or erosion products, e.g. chips and gases, which tend, in the arrangement described, to be removed rather quickly from the EDM gap, thus keeping the latter region substantially purified and practically free from these contaminants. As a result, it has been recognized that only about 30% of applied voltage pulses can cause electrical discharges for stock removal.

In accordance with an important feature of the present invention, a pad or block member 14 is provided in the apparatus to control removal or discharge of the machining products out of the EDM gap so that their concentration in the machining liquid at the EDM gap is maintained in excess of a predetermined level, thus permitting a stabilized production of electrical discharges and a consequential stabilization of the electrode feed displacement and the machining process. By virtue of the provision of the block member, it has been found that more than 70% of applied voltage pulses are allowed to create electrical discharges for stock removal from the workpiece 2.

The block member 14 is formed with a central bore 14a for accepting the tool electrode 1 therethrough and is disposed in the proximity of the unmachined or machined upper surface of the workpiece 2 with a small spacing 15 therewith and so as to surround the tool electrode 1 with a small spacing 16 therewith. The small spacings 15 and 16 are both generally not greater than 1 mm, although the precise values depend upon the particular size of the workpiece area to be machined and the particular mode (i.e. roughing, medium or finishing) selected. The block member 14 shown has, at its top, a central annular recess 14b which accepts the lower end of the cylindrical guide member 3 for the tool electrode 1 to securely connect the body of the block member 14 to the guide member 3. The central bore 14a is shown formed in flush with the internal bore 3a of the electrode guide member 3 at a lower portion thereof. As shown, the block member 14 is flanged at its lower part having the lower-end surface extending in parallel with the upper surface of the workpiece with the uniform spacing 15.

The block member 14 is arranged to be vertically displaceable by a motor 17. The motor 17 may be controlled by command signals from the NC unit 6 to control the vertical position of the block member 14 so as to maintain the small spacing 15 with the workpiece 2 substantially constant. The command signals for the motor 17 are derived in the NC unit from data for the shape of the cavity to be machined in the workpiece 2 and the programmed successive positions of the active machining contour 1a of the tool electrode 1 relative to the workpiece 2. The motor 17 may also respond to a gap signal indicating a deterioration of the gap state, e.g. a development of an arc or abnormal discharges, to widen the spacing 15 for recovery of a normal gap state. In this manner the vertical position of the block member 14 is controlled with the progress of EDM operation and displacement of the machining region. The block member 14 may also be vertically reciprocated with a small stroke to intermittently widen the spacing with the workpiece 2.

Figure 2:
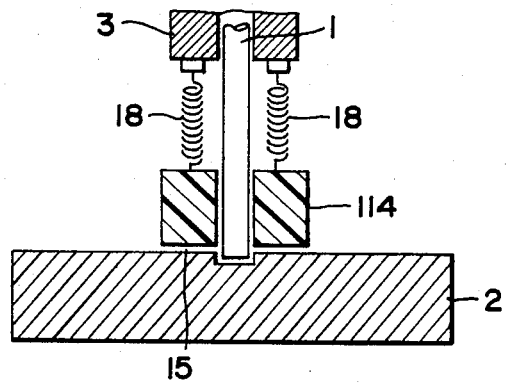
FIG. 2 is an elevationally sectional view diagrammatically illustrating a modified embodiment of the assembly according to the invention.

FIG. 2 shows a modified embodiment of the assembly according to the invention for maintaining the contamination of the machining liquid with machining products in the gap at an enhanced level. The assembly comprises a block member 114 which may be of a form shown in FIG. 1 but is here shown to be cylindrical. The block member 114 is urged downwards by a plurality of springs 18, e.g. four springs of which only two are seen in FIG. 2. The springs 18 are secured to and between the guide member 3 and the block member 114 and act to press the block member 114 towards the workpiece 2 against the pressure of the machining liquid passing through the narrow spacing 15 from the EDM gap.

Figure 3:
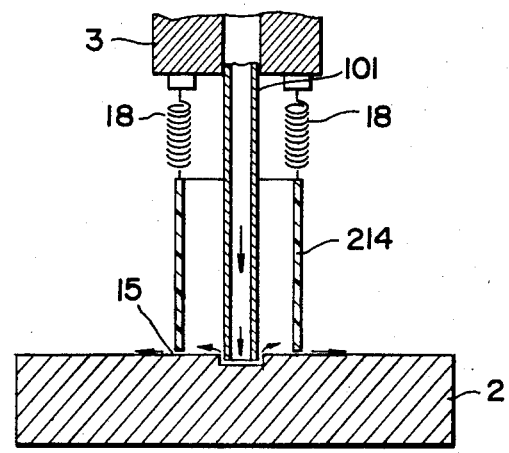
FIG. 3 is a similar view diagrammatically illustrating a further modified embodiment of the assembly according to the invention.

In an arrangement shown in FIG. 3, a tubular electrode 101 of relatively small cross section is employed to serve as the generic electrode and the block member is in the form of a tubular member 214 of relatively large cross section disposed coaxially with the tubular electrode to form a small spacing 15 with the workpiece 2. In this embodiment, too, springs 18 are disposed between the guide member 3 and the block member 214 to urge the latter downwards against the pressure of the machining liquid traversing the small spacing 15.

Figure 4:
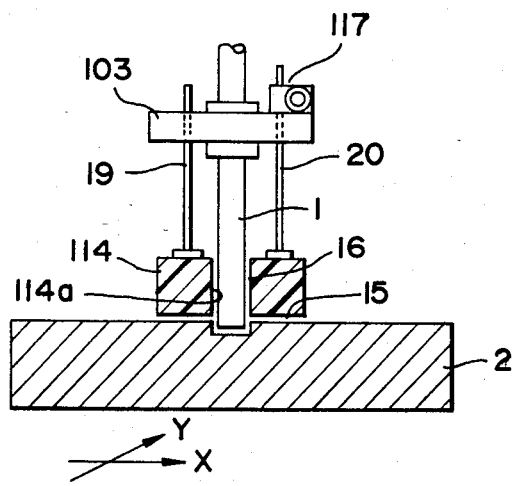
FIG. 4 is a similar view diagrammatically illustrating a further embodiment of the assembly according to the invention.

Referring to FIG. 4, which shows a further embodiment of the assembly according to the invention, the cylindrical or annular block member 114 traversed by the tool electrode 1 through its central bore 114a depends from a guide head member 103 via one or more guide rods 19 and a drive rod 20. The head member 103 is fixed in position and has a central opening through which the electrode 1 is passed and controlledly moved in the vertical direction. The drive rod 20 is driven by a feed motor 117 which is securely mounted on the head member 103. The feed motor 117 is driven in response to command signals from the NC unit 6 (FIG. 1) to control the vertical position of the block member 114. The motor 117 may also respond to a gap signal to control the width of the small spacing 15 as previously described.

The block member 14, 114, 214 should be composed of an electrically insulating material such as a plastic material and, if composed of a metal or another conductive substance, should be covered with a surface layer of insulating material to establish electrical insulation from the tool electrode 1 and the workpiece 2, and especially from the latter. The insulating material should also be reasonably resistant to electrical discharge heat and to corrosion or degeneration by being contacted with the machining liquid.

In a given machining operation, a plurality of block members 14, 114, 214 of different shapes and/or sizes may be employed in sequence. To this end, several block members may be detachably stored in a magazine or exchanged together with generic electrodes 1, 101.

Figure 5:
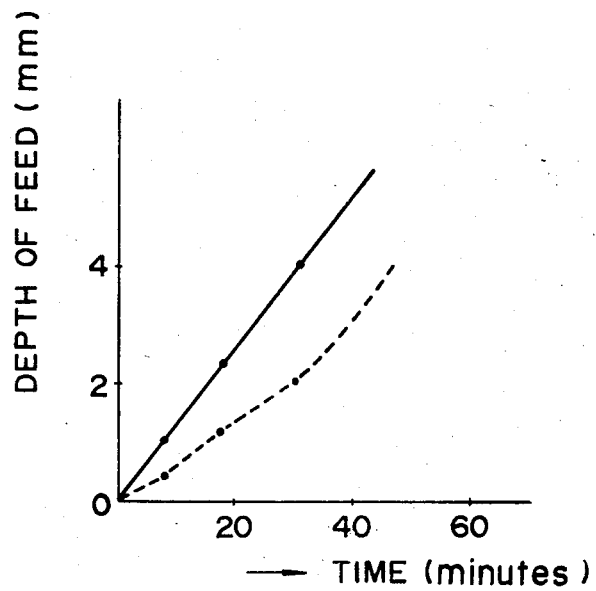
FIG. 5 is a graph showing a machining characteristic obtained in a generic EDM with an assembly according to the invention, compared with that obtained without such an assembly.

FIG. 5 shows a graph representing a machining characteristic obtained in a generic EDM process with an assembly according to the invention (solid curve), compared with that obtained without such an assembly (broken curve). In the graph, machining time is plotted along the abscissa and the depth of machining feed is plotted along the ordinate. From the graph it is seen that a marked improvement in machining performance is achieved according to the invention, especially in the initial stage of machining. Machining conditions employed are set out as follows: An S55C (Japanese Industrial Standard) carbon steel was machined three-dimensionally with a generic electrode composed of copper and having a diameter of 11 mm. A succession of discharge pulses applied had a pulse duration $\tau on$ of 120 $\mu s$, a pulse interval of 100 $\mu s$ and a peak current Ip of 10 amperes. The workpiece was displaced horizontally at a feed rate of 1 mm/min (const) while the tool electrode was displaced vertically and servo-controlled. The block member employed was cylindrical (FIG. 4) having an inner diameter of 12 mm, an outer diameter of 20 mm and a thickness of 5 mm. It was found that more than 70% of applied voltage pulses caused electrical discharges and the stock removal proceeded at a rate of 0.7 grams/min.

What is claimed is:

1. An EDM method of machining a desired pattern in a conductive workpiece with at least one tool electrode having a machining surface contour which is of a configuration generally independent of the shape of the desired pattern, the method comprising the steps of:
   (a) axially juxtaposing said tool electrode with the workpiece to position said machining surface contour in a spaced juxtaposition therewith across an EDM gap supplied with an EDM liquid;
   (b) disposing a bored block member having a central bore and a frontal surface surrounding said central bore in the proximity of the workpiece so that at least a portion of the tool electrode proximate to said machining surface contour is situated in said bore and said frontal surface is spaced from said workpiece with a distance not less than the width of said EDM gap;
   (c) electrically insulating said block member both from said tool electrode and said workpiece;

(d) producing a succession of electrical discharges across the EDM gap to electroerosively remove stock from a localized portion of said workpiece juxtaposed with said machining surface contour while permitting machining products produced by the electrical discharges to be accumulated in the EDM gap for removal therefrom; and (e) mechanically impeding, with said frontal surface of the block member so disposed and arranged as defined in steps (b) and (c), the removal of the machining products from the EDM gap so that the concentration of the machining products in the EDM liquid in the EDM gap is maintained in excess of a predetermined level to stabilize said electrical discharges while effecting a multi-axial machining feed displacement between the tool electrode and the workpiece along a predetermined three-dimensional path defined by three coordinate axes including a pair of coordinate axes defining a plane substantially orthogonal to the longitudinal axis of said tool electrode and a coordinate axis substantially orthogonal to said plane and maintaining said EDM gap substantially constant, thereby three-dimensionally machining said workpiece at least in part by said stabilized electrical discharges to form the desired pattern in the workpiece.

2. An EDM apparatus for machining a desired three-dimensional pattern in a conductive workpiece, the apparatus comprising:

at least one tool electrode having a machining surface contour which has a configuration generally independent of the shape of said desired pattern and adapted to be axially juxtaposed with the workpiece to position said machining surface contour in a spaced juxtaposition therewith across an EDM gap supplied with an EDM liquid;

a bored block member having a central bore and a frontal surface region surrounding said central bore, both adapted to be disposed in the proximity of said workpiece, so as to locate at least a portion of said tool electrode proximate to said machining surface contour in said bore and to position said frontal surface region spaced away from said workpiece with a distance not less than said EDM gap, said member being so constructed as to establish an electrical insulation both from said tool electrode and said workpiece;

power supply means for producing a succession of electrical discharges across the EDM gap to electroerosively remove stock from a localized portion of said workpiece juxtaposed with said machining surface contour while permitting machining products produced by the electrical discharges to be accumulated in the EDM gap for removal thereof;

means for holding said block member whereby said frontal surface impedes the removal of the machining products from the EDM gap so that the concentration of the machining products in the machining liquid at said EDM gap is maintained in excess of a predetermined level to stabilize said electrical discharges; and feed means for effecting a multi-axial machining feed displacement between the tool electrode and the workpiece along a predetermined three-dimensional path defined by three coordinate axes including a pair of coordinate axes defining a plane substantially orthogonal to the longitudinal axis of said tool electrode and a coordinate axis substantially orthogonal to said plane while maintaining said EDM gap substantially constant, thereby three-dimensionally machining said workpiece at least in part by said stabilized electrical discharges to form the desired pattern in the workpiece.

3. For use with an EDM apparatus for machining a three-dimensional pattern in an electrically conductive workpiece, having at least one tool electrode which has a machining surface contour having a configuration generally independent of the shape of the desired pattern and adapted to be axially juxtaposed with the workpiece to position the machining surface contour in a spaced juxtaposition therewith across an EDM gap supplied with an EDM liquid, power supply means for producing a succession of electrical discharges across the EDM gap to electroerosively remove stock from a localized portion of the workpiece juxtaposed with the machining surface contour while permitting machining products produced by the electrical discharges to be accumulated in the EDM gap for removal therefrom, and feed means for effecting a multi-axial feed displacement between the tool electrode and the workpiece along a predetermined three-dimensional path defined by three coordinate axes including a pair of coordinate axes defining a plane substantially orthogonal to the longitudinal axis of the tool electrode and a coordinate axis substantially orthogonal to said plane while maintaining the EDM gap substantially constant, thereby three-dimensionally machining the workpiece at least in part by the electrical discharges to form the desired pattern in the workpiece, an assembly for maintaining the concentration of the machining products in the EDM liquid at the EDM gap in excess of a predetermined level, the assembly comprising:

a bored block member having a central bore and a frontal surface region surrounding said central bore, both adapted to be disposed in the proximity of said workpiece so as to locate at least a portion of said tool electrode proximate to said machining surface contour in said bore and to position said frontal surface region spacedly away from the workpiece with a distance not less than said EDM gap, said member being so constructed as to establish an electrical insulation both from said tool electrode and said workpiece, and means for holding said block member whereby said frontal surface region mechanically impedes the removal of the machining products from said EDM gap to stabilize said electrical discharges in the three-dimensional machining of the desired pattern in the workpiece.

4. The method defined in claim 1 wherein said distance is not greater than 1 mm when said tool electrode is so positioned as defined in step (a).

5. The method defined in claim 1 or claim 2 wherein said frontal surface has a width, in a direction perpendicular to said longitudinal axis, of not less than said distance when said block member is so disposed as defined in step (b).

6. The method defined in claim 1 wherein said electrical discharges are produced across said EDM gap by supplying a succession of voltage pulses between the tool electrode and said workpiece and said discharge of the machining products from said EDM gap is impeded so as to allow at least 70% of voltage pulses to result in corresponding electrical discharges effective to remove stock from the workpiece across said gap.

7. The method defined in claim 1 wherein said cental bore has a bore wall adjacent to said frontal region spaced from said tool electrode with a second distance which is not less than said EDM gap.

8. The method defined in claim 7 wherein said second distance is not greater than 1 mm.

9. The method defined in claim 1 wherein said block member is disposed so as to enable said tool electrode to move in a direction of said longitudinal axis while maintaining said distance substantially constant.

10. The method defined in claim 1 wherein said block member is movable independently of said tool electrode, further comprising the step of moving said block member to enlarge said distance in response to a signal representing a deterioration of said EDM gap from a normal condition.

11. The method defined in claim 1 wherein said block member is movable independently of said tool electrode, further comprising the step of intermittently moving said block member away from said workpiece to enlarge said distance.

12. The apparatus defined in claim 2 wherein said frontal surface region has a width, in a direction perpendicular to said longitudinal axis, of not less than said distance.

* * * * *